US012682660B2

(12) United States Patent
Aquilina et al.

(10) Patent No.: US 12,682,660 B2
(45) Date of Patent: Jul. 14, 2026

(54) SYSTEM AND METHOD OF DATA COLLECTION AT A VEHICLE FOR STREET MONITORING, AND VEHICLE INCORPORATING SAME

(71) Applicant: Aptiv Technologies AG, Schaffhausen (CH)

(72) Inventors: Kirsty Aquilina, Wuppertal (DE); Michele Giorelli, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 90 days.

(21) Appl. No.: 18/443,908

(22) Filed: Feb. 16, 2024

(65) Prior Publication Data

US 2024/0282122 A1     Aug. 22, 2024

(30) Foreign Application Priority Data

Feb. 21, 2023     (EP) .................................... 23157693

(51) Int. Cl.
| | |
|---|---|
| *G06V 20/58* | (2022.01) |
| *G01M 99/00* | (2011.01) |
| *G06V 10/764* | (2022.01) |
| *G06V 20/56* | (2022.01) |
| *G07C 5/08* | (2006.01) |

(52) U.S. Cl.
CPC ........... *G06V 20/588* (2022.01); *G01M 99/00* (2013.01); *G06V 10/764* (2022.01); *G07C 5/0808* (2013.01)

(58) Field of Classification Search
CPC ........ G06F 9/50; G06V 20/56; G06V 10/764; B60W 2420/403; B60W 2556/45
See application file for complete search history.

(56) References Cited

U.S. PATENT DOCUMENTS

| | | |
|---|---|---|
| 2010/0007476 A1 | 1/2010 | Klotz |
| 2017/0160746 A1* | 6/2017 | Rao ........................... B61L 3/06 |
| 2018/0188037 A1* | 7/2018 | Wheeler ............. G06V 20/582 |
| 2019/0205669 A1 | 7/2019 | Altinger |
| 2020/0201325 A1* | 6/2020 | Parekh ...................... G06F 9/50 |

FOREIGN PATENT DOCUMENTS

| | | |
|---|---|---|
| DE | 102014009869 A1 | 1/2016 |
| DE | 102017219926 A1 | 5/2019 |
| DE | 102018107360 A1 | 10/2019 |

(Continued)

OTHER PUBLICATIONS

Extended European Search Report for EP23157693.5, 12 pages Jul. 17, 2023.

(Continued)

*Primary Examiner* — Kenneth J Malkowski
(74) *Attorney, Agent, or Firm* — Miller Johnson

(57) ABSTRACT

A vehicle includes at least one sensor, a classifier, and a controller. The at least one sensor is for capturing data of external environmental conditions. The classifier is for classifying between a first mode relating to one or more driving assistance functions and a second mode relating to at least one street condition from the captured data. The controller is configured to monitor a processing load of the vehicle and allocate processing resources to the first mode and/or second mode.

13 Claims, 1 Drawing Sheet

(56) References Cited

FOREIGN PATENT DOCUMENTS

DE        102018220791 A1      6/2020

OTHER PUBLICATIONS

Sensoneo Website, "Monitor fill-levels of waste in bins," https://sensoneo.com/smart-waste-monitoring/, accessed Mar. 11, 2024.

R4 Monitoring, "Waste Monitoring Systems," https://www.r4m.co/waste-monitoring-systems/, last accessed Mar. 11, 2024.

Satyamanikanta et al., "Smart garbage monitoring system using sensors with RFID over internet of things," Journal of Advanced Research in Dynamical and Control Systems 9:Jun. 2017, pp. 133-140, Jul. 2017.

Ishu et al., "A Detailed Study on Smart Waste Monitoring Systems, an Application of Internet of Things," IJRASET, vol. 9, Issue 3, pp. 573-577, Mar. 2021.

Manikanta et al., "Digital Waste Monitoring System Using Sensors Over Iot," IJRTE, vol. 7, Issue 6S4, pp. 443-447, Apr. 2019.

Mr. Fill Website, "Sensor Fill," https://www.mr-fill.com/products/smart-sensor/, last accessed Mar. 11, 2024.

AbdElminaam, "Design and Fabrication Smart Garbage Management and Monitoring System Using Automatic Unloading Robot in Residential Area," International Arab Journal of e-Technology, vol. 5, No. 4, Jun. 2019, pp. 153-169.

Arun et al., "Garbage Collection Robot and Monitoring System Using Wireless Communication," European Journal of Molecular & Clinical Medicine, vol. 7, Issue 11, Mar. 2021.

Asulu et al., "IoT Based Solar Integrated Garbage Monitoring Using Robot On Raspberry Pi," International Journal of Mechanical And Production Engineering, ISSN: 2320-2092, vol. 5, Issue 10, pp. 22-26 Oct. 2017.

Kulshreshtha et al., "OATCR: Outdoor Autonomous Trash-Collecting Robot Design Using YOLOv4-Tiny," Electronics 2021, 10(18), 2292, 22 pages, Sep. 18, 2021.

Bai et al., "Deep Learning Based Robot for Automatically Picking up Garbage on the Grass," DOI 10.1109/TCE.2018.2859629, IEEE Transactions on Consumer Electronics, pp. 1-8, 2018.

Barriera et al., "In Situ Pavement Monitoring: A Review," Infrastructures 2020, 5(2), 18, 19 pages, Feb. 7, 2020.

Vittorio et al., "Automated Sensing System for Monitoring of Road Surface Quality by Mobile Devices," Astarita Vittorio et al. / Procedia—Social and Behavioral Sciences 111 ( 2014 ) 242-251, Feb. 18, 2014.

IntelliTrac Website, "Street Sweeping GPS Telematics Solutions," https://www.intellitrac.com.au/StreetSweeping.html, last accessed Mar. 11, 2024.

Ping et al., "Smart Street Litter Detection and Classification Based on Faster R-CNN and Edge Computing," International Journal of Software Engineering and Knowledge Engineering, vol. 30, No. 04, pp. 537-553, Jan. 30, 2020.

Roadmaps for Energy (R4E) Website, "Smart Monitoring System in Public Transport of Istanbul," https://roadmapsforenergy.eu/smart-monitoring-system-in-public-transport-of-istanbul/, last accessed Mar. 11, 2024.

Parkinto Website, "Detection of Parking Lot Occupancy Using a Camera," https://parkinto.com/, last accessed Mar. 11, 2024.

Acharya et al., "Real-time image-based parking occupancy detection using deep learning," Proceedings of the 5th Annual Research, vol. 2087, pp. 33-40, Apr. 2018.

Li et al., "Vacant Parking Slot Detection in the Around View Image Based on Deep Learning," Sensors 2020, 20(7), 2138, 22 pages, Apr. 10, 2020.

Li et al., "Road Pothole Detection System Based on Stereo Vision," Thesis for Degree of Master of Science, Department of Electrical Engineering & Computer Science, 53 pages, Aug. 2018.

Al-Falahi et al., "Automated Data Collection System of Pavement Distresses: Development, Evaluation & Validation of Distress Types and Severities," IOP Conf. Ser.: Mater. Sci. Eng. 471 062015, 16 pages, 2019.

Guo et al., "A pavement distresses identification method optimized for YOLOv5s," Scientific Reports, 12: 3542, 15 pages, Mar. 3, 2022.

Ma et al., "Computer vision for road imaging and pothole detection: a state-of-the-art review of systems and algorithms," Transportation Safety and Environment, vol. 4, Issue 4, Dec. 2022.

Xu et al., "Vision-Based Pavement Marking Detection and Condition Assessment—A Case Study," Appl. Sci. 2021, 11 (7), 3152, 17 pages.

GL Optic Website, "GL Opticam 3.0 4K Tec," https://gloptic.com/products/gl-opticam-3-0-4k-tec/, last accessed Mar. 11, 2024.

Xie et al., "Real-Time Illegal Parking Detection System Based on Deep LEarning," ICDLT '17, Jun. 2-4, 2017, Chengdu, China, pp. 1-5, Jun. 2017.

Peng et al., "Real-Time Illegal Parking Detection Algorithm in Urban Environments," IEEE Transactions on Intelligent Transportation Systems, vol. 23, Issue 11, 18 pages, Jun. 15, 2022.

Dewangan et al., "PotNet: Pothole detection for autonomous vehicle system using convolutional neural network," Electronics Letters, vol. 57 No. 2, pp. 23-56, Sep. 19, 2020.

Iskhakov et al., "Intelligent System of Environment Monitoring on the Basis of a Set of IOT-Sensors," 2019 International Siberian Conference on Control and Communications (SIBCON), 5 pages, Jun. 6, 2019.

Karthick Pannerselvam, "Adaptive Parking Slot Occupancy Detection Using Vision Transformer and LLIE," 2021 IEEE International Smart Cities Conference (ISC2), 7 pages, Oct. 15, 2021.

Lo Re et al., "Urban Air Quality Monitoring Using Vehicular Sensor Networks," Advances onto the Internet of Things. Advances in Intelligent Systems and Computing, vol. 260. Springer, Cham. https://doi.org/10.1007/978-3-319-03992-3_22, Jan. 1, 2014.

Iparraguirre et al., "Road Marking Damage Detection Based on Deep Learning for Infrastructure Evaluation in Emerging Autonomous Driving," IEEE Transactions on Intelligent Transportation Systems, vol. 23, issue 11, 8 pages, Nov. 2022.

Nukita et al., "Damaged Lane Markings Detection Method with Label Propagation," 2018 IEEE 24th International Conference on Embedded and Real-Time Computing Systems and Applications (RTCSA), 6 pages, Jan. 10, 2019.

Medehal et al., "Automated Smart Garbage Monitoring System with Optimal Route Generation for Collection," 2020 IEEE International Smart Cities Conference (ISC2), 7 pages, Oct. 29, 2020.

Balchandani et al., "A Deep Learning Framework for Smart Street Cleaning," 2017 IEEE Third International Conference on Big Data Computing Service and Applications (BigDataService), 6 pages, Jun. 12, 2017.

Ghildiyal et al., "Street Cleanliness Monitoring System using Deep Learning," 2021 Third International Conference on Intelligent Communication Technologies and Virtual Mobile Networks (ICICV), 6 pages, Mar. 31, 2021.

Ghose et al., "Road condition monitoring and alert application: Using in-vehicle Smartphone as Internet-connected sensor," 2012 IEEE International Conference on Pervasive Computing and Communications Workshops, 3 pages, Mar. 20, 2012.

* cited by examiner

SYSTEM AND METHOD OF DATA COLLECTION AT A VEHICLE FOR STREET MONITORING, AND VEHICLE INCORPORATING SAME

CROSS-REFERENCE TO RELATED APPLICATIONS

This application claims priority to EP 23157693 filed Feb. 21, 2023, the entire disclosure of which is incorporated by reference.

FIELD

The present disclosure relates to a system and method of data collection in, at or on a vehicle for monitoring a street, i.e. particularly for the purpose of improving external environmental conditions, such as cleanliness.

BACKGROUND

Living in a clean outdoor environment free of waste products such as used packaging improves wellbeing of human and animal populations. Thus, technology has been deployed to aid in achieving a cleaner environment in cities and towns. For example, implementing sensors or use of a robot in combination with a garbage bin can monitor waste and assist in bins being emptied or filled with refuse. Other studies propose robots that use cameras to detect individual items of waste in an outdoor environment and then pick up the items with a gripper or scoop and place them in an onboard bin.

Recently there has been interest in assessing the cleanliness of roads using mobile devices such as CCTV cameras on garbage trucks or smartphones, implemented using neural networks and captured images. Other systems assess properties of road conditions, such as mechanical properties via sensors embedded in the road. Some solutions track surface anomalies such as potholes and speed bumps using accelerometers in smartphones. There are also solutions that provide vehicle add-on hardware and software to monitor road conditions and cleanliness. Yet further known systems propose monitoring crime, accidents or air pollution by integrating sensors into public transport vehicles. However, it will be apparent that these proposed approaches all require additional equipment for monitoring, which can be a drawback in many circumstances and prevent successful implementation.

Parking is another concern in cities/towns and information related to this topic can be useful to local authorities, residents and road-users alike. Most parking space occupancy systems monitor by the use of sensors mounted around the parking lot.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure seeks to address issues with conventional solutions or at least provide an alternative to the public and municipal authorities.

According to a first aspect, a system of data collection at a vehicle is provided, particularly for the purpose of ultimately improving external environmental conditions such as street cleanliness. The system comprises or is embodied by a vehicle having at least one sensor (e.g. an image sensor, RADAR, LiDAR, or other proximity/determination sensor, etc) for capturing data about external environmental conditions, a processor configured for classifying one or more street conditions (e.g. cleanliness, parking, damage, illumination) and functions associated with driving assistance (i.e. an ADAS, advanced driving assistance system) and allocating processing resources while maintaining uncompromised safe operation of the vehicle. Onboard wireless communication may be utilized for communicating the classified street condition to a remote collation station. The management of processing resources in turn manages heat generated by the processor within safe operational limits. A vehicle according to the invention is outlined by appended claim 1.

In one form, the vehicle comprises: at least one sensor for capturing data of external environmental conditions; an electronic control unit; a processor controlled by the control unit for classifying at least one street condition from the captured image data; and wireless communication controlled by the control unit for communicating the at least one classified street condition to a remote receiving station.

In a particular example, the problem of reducing the incidence of undesirable waste items on a street can be solved by inferring road cleanliness information using on-vehicle sensing and computing power and then sending the information to relevant parties (e.g. responsible parties such as local authorities). On-vehicle sensing and processing capability is already present for utilization in the performance of other vehicle functions, such that no additional and/or dedicated sensing is needed to implement the invention.

Using information collected according to the invention, responsible stakeholders can deploy street maintenance or cleaning services in a more efficient manner and also learn patterns, habits and trends of street condition, such as cleanliness, in a particular location or across locations in a town, city or country.

In a broad sense, the inventive concept recognizes using already available sensors on a vehicle (e.g. an OEM vehicle as supplied to a customer) to perform additional tasks, i.e. beyond the driving assistance and/or vehicle operation-related tasks they were put there for. As such, the vehicle is able to operate in at least two modes, a first driving assistance mode and a second street condition reporting mode, or a combination of these, and switch between the modes. In embodiments, the system may interrupt street condition reporting mode and revert to driving assistance mode, as determined by a perception controller according to incoming data classification. The tasks are executed via artificial intelligence processing to monitor the environment, such as in or adjacent a street, for anomalies that can be communicated outside the vehicle to help authorities, via a receiving station, allocate cleaning/maintenance services etc.

As such, data collection via smart vehicles equipped with sensors can help improve the quality of life in cities by assisting authorities to act in a timely and efficient manner. As discussed herein, there are a number of applications for which such a system could help society, for instance: street cleanliness, parking, and road and curb maintenance.

For example, while parking systems that assist parking maneuvers by use of onboard vehicle sensors such as cameras (surround view monitoring) are known to obtain required information about empty parking slots, these are not for monitoring and reporting purposes as described herein.

Further, monitoring the quality of road infrastructure can also help improve the urban experience for drivers and pedestrians. Constant monitoring of potholes, line marking damage and curb damage, in accordance with embodiments of the invention, can help city authorities to ensure timely maintenance is provided.

Likewise, lane marking damage can be assessed using monitoring of images by a system according to embodiments of the invention. Such an embodiment implements a lane marking damage classifier.

Other kinds of anomalies visible on or adjacent a street, such as curb damage and illegal parking (e.g. cars parked over garages or entrances, double-parked, etc.), may also be monitored according to embodiments of the invention. Indeed, street illumination/measurement can also be subject to monitoring by utilizing built-in vehicle sensors that are not dedicated to that purpose, but multi-tasked and leveraged for additional monitoring for communication to a remote station.

In embodiments, the vehicle system is managed by a controller, e.g. in the vehicle, controlling operation and interaction of the functional components. The vehicle control unit may be one or more processors as described herein.

In embodiments, the processor or vehicle electronic control unit is configured to allocate resources (i.e. processing power) to the task of monitoring an environmental condition when it is safe to do so. For example, when sufficient processing headroom is available for image processing to classify a street condition, without compromising minimum level safety protocols for vehicle operation. Such allocation may take place when the vehicle is parked, stationary, according to speed (i.e. a lower speed may allocate more resources to non-safety functions compared to a high speed) and/or in traffic. Furthermore, the processor may select which sensors are directed to a certain task, e.g. driving assistance or street condition. A configuration to monitor real-time processing load can identify when sufficient resources are available, and in turn "switch on" monitoring of non-safety/vehicle related monitoring of street conditions. In this way, resources actively working on other vehicle services, such as collision warning, should not be compromised. In the scenario of an autonomous drive vehicle, it will be apparent that the priority during a normal driving operation is to fully monitor external conditions and classify for objects relating to safe operation of the vehicle, whereas in a stationary state resources free up for allocation to street condition monitoring. In a highway driving scenario, where the road is relatively clear, a controller may also allocate resources accordingly and/or select which sensors are needed for safe operation, while diverting others to street condition functions.

In embodiments, the system of collecting data for determining a street condition is passive, from the perspective of a vehicle operator. In other words, resource allocation and reporting is performed automatically without vehicle operator input. In certain practical implementations, a vehicle operator may be incentivized to contribute data to the monitoring station by rebates, free parking or other enticements.

In embodiments, the at least one sensor is an in-built camera in the vehicle, e.g. where the camera has another primary image capturing function required by a vehicle operation feature, such as a reversing camera, front facing camera, spatial warning/parking cameras, etc. The vehicle may be a private motor vehicle. The other image capturing functions may be related to safety or other useful features expected by modern vehicle users.

In embodiments, the image processor may be modular and/or configured for image processing functions in addition to classifiers for street cleanliness, road condition, illumination, curb condition, parking anomalies, etc. For example, the image processor may have dual or multiple functions for classifying objects, e.g. as part of a spatial awareness system with warning alerts. The image processor may alternatively be termed a classifier unit, or at least one classifier unit, e.g. each assigned a different monitoring task such as waste identification (which may have multiple sub-classifications), road condition (e.g. potholes, line marking damage), parking (e.g. space identification or infringement). The classifier unit may be a separate or integrated module with other classifying functions (e.g. pedestrian, lane or hazard identification). The classifier, such as a neural network, is trained according to known machine learning techniques. For example, a model can be trained to identify types and amount of waste in an image, as distinct from other items that are supposed to be present on a street, such as a lamppost, waste bin, plants, etc. A learning model is subject to continual improvement. In embodiments, the classifier is a trained object detection algorithm.

In embodiments, the classified street monitoring data is routed through an infotainment system of the vehicle to the wireless communication means. An infotainment service is a common relay for communication in a vehicle.

In embodiments, the system is configured to send Global Positioning System (GPS) location data with the wireless communication for communicating classified street data. Sent data may also include a timestamp to identify when an observation was made. In this way, a location/time is provided along with a message reporting about the street, e.g. whether the road is clean or dirty, subject to thresholds determined by the machine learning classifier. Alternatively, the location/message may only be sent when an adverse condition is detected. The communication is to be received by a monitoring station, e.g. a central control center, that collates incoming street condition data and is able to allocate waste collection or maintenance services accordingly.

In embodiments, the system is configured to send images of the street with the wireless communication. In certain situations, the image data may relate to a crime such as illegal parking or fly-tipping, i.e. where large amounts of waste are illegally dumped on a roadside. The monitoring station may report such criminal activity and any associated evidence. Alternatively, or in addition, an image processing step may blur out faces or number plates captured in the image.

In embodiments, the system is configured to send a sub-classification of the observed waste with the wireless communication. In this way, bulky and/or hazardous (toxic) garbage may be addressed by a specific kind of clean up vehicle.

In a second aspect, the invention provides an in-vehicle street condition monitoring system, comprising: a classifier for classifying image data, captured from at least one image sensor in a vehicle, according to street condition; a communicator for sending the classified image data to a receiving station. The in-vehicle system may be supplemented with any of the features described above or herein. The street condition may relate to cleanliness, damage, a parking aspect or any other anomaly able to be identified as outside "normal" parameters of a clean and/or well-maintained street.

In a third aspect, the invention provides a method of monitoring street condition (e.g. cleanliness), comprising steps of: capturing image data of external environmental conditions from at least one image sensor in a vehicle; classifying the captured image data according to street condition (e.g. cleanliness), communicating classified street condition to a monitoring station (e.g. for street maintenance services to be allocated). In one form, GPS data is additionally communicated. In one form, image data is additionally communicated. In one form, classification data is additionally communicated, e.g. such that a type of waste removal or maintenance service can be allocated. The method may be supplemented with any of the features described above or herein.

According to a fourth aspect, there is provided a non-transitory computer readable medium including instructions, which when executed by one or more processors, implement the foregoing method of the third aspect. According to a further aspect, there is provided a computer software product including instructions which, when executed by one or more processors, implement the above method.

Particular advantages and added-value of the present invention, compared to known monitoring systems, include: overall street cleanliness is observed and not only at bins or individual items of garbage; dirt reduction possible by inferring road cleanliness information; information about city parking availability is possible by monitoring/computing on-street parking spots occupancy; information about street illumination is possible by computing light level, which can be important for long term studies to decide whether to increase or reduce street lighting and also to check for faulty street lights if a lower level of illumination than expected is recorded; quality of the road infrastructure can be observed and managed, such as damaged curbs, uneven road surfacing and holes, and damaged line markings; information about cars parked in illegal areas can be collected, such as next to garbage bins, in front of garages and also double parked in the road; water leak detection is possible, e.g. to report if a particular street requires maintenance or if someone is washing their car in the street; ensuring higher safety for pedestrians by checking if the curb is covered in ice/snow; and no add-on hardware is required as the system utilizes what is already available in a smart vehicle. Particularly, the solutions known in the prior art do not use OEM camera(s), but require additional bolt-on hardware. Similarly, no dependence on a local authority investment to equip public transport or city infrastructure with sensors, instead using what is already available on smart vehicles. Further, no requirement for a user/driver to take any action than simply agree with the initial set up. There are no additional apps required to be managed by the user as this would be part of the smart vehicle ecosystem.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Illustrative embodiments will now be described with reference to the accompanying drawings in which.

6

Figure 1:
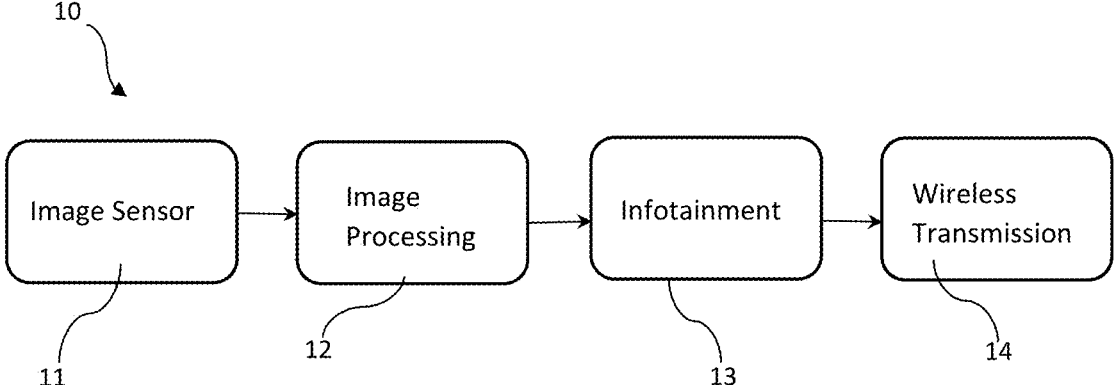
FIG. 1 illustrates a flow diagram of one implementation of system according to the invention.

In the drawings, reference numbers may be reused to identify similar and/or identical elements.

DETAILED DESCRIPTION

The following description presents various embodiments and, together with the drawings, serves to explain principles of the invention. However, the scope of the invention is not intended to be limited to the precise details of the embodiments or exact adherence with all system features and/or method steps, since variations will be apparent to a skilled person and are deemed also to be covered by the description. Terms for components used herein should be given a broad interpretation that also encompasses equivalent functions and features. For example, the terms "waste," "garbage" etc. used herein are general descriptions synonymous with refuse, trash, dirt, debris, detritus and rubbish, all generally considered to undesirable.

In some cases, several alternative terms (synonyms) for structural, system features have been provided but such terms are not intended to be exhaustive. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Any directional terms such as "vertical", "horizontal", "up", "down", "sideways", "upper" and "lower" are used for convenience of explanation usually with reference to the form shown in illustrations and are not intended to be ultimately limiting if an equivalent function can be achieved with an alternative dimension and/or direction. All directional terms are relative to each other.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

It will be understood that the illustrated embodiments show applications only for the purposes of explanation. In practice, the invention may be applied to many different configurations, where the embodiment is straightforward for those skilled in the art to implement.

An example system architecture 10 is shown by FIG. 1, where functions undertaken at a vehicle (e.g. a private/OEM motor vehicle) are outlined. In a first step 11, at least one image sensor, e.g. a built-in vehicle camera (21a-g, see FIG. 2), collects image data for subsequent processing in a second step 12.

Image data about the road environment surrounding a vehicle 20 (see FIG. 2) can be gathered at any time, but for the purposes of monitoring street condition, is enabled when the car has stopped for traffic signals, parking or when it is moving slowly. This is to ensure that the vehicle meets minimum standards of its safety protocols. In particular forms, a vehicle control unit may monitor processing resources and enable image processing 12 only when sufficient resources are available. Monitoring resources may be less critical in future embodiments where processing power is less limited.

Figure 2:
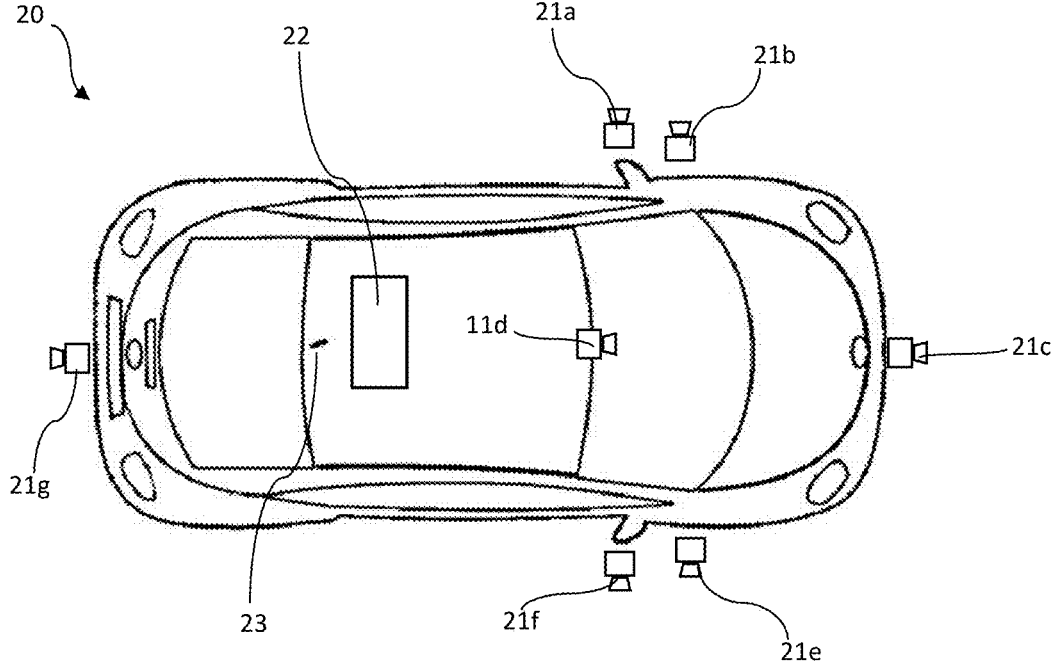
FIG. 2 illustrates a vehicle incorporating a system according to the invention.

As shown in FIG. 2, the vehicle 20 is equipped with at least one camera e.g. a rear-facing camera 21g, front-facing camera 21c and various side-facing cameras 21a,b,e,f). The more cameras available, the more information can be potentially fed to the image processing step 12.

The following example is described with reference to a scenario for monitoring street cleanliness.

Particularly, at the second step 12, a classifier program of an onboard processor 22, such as a neural network, can be trained to classify between a clean or dirty environment. Such classification may be implemented from studies on garbage segmentation and road cleanliness assessment.

As indicated, an output of the classifier will be computed by an image processing unit/processor 22 and optionally passed through an infotainment function at a third step 13, and onwards to a wireless transmission device at a fourth step 14. The transmission system may be either a smartphone connected to the car or any inbuilt transmission capability already available in the vehicle such as an emergency call function, e.g. communicated from a transceiver antenna 23.

In a particular implementation, the system is configured to send GPS location and/or timestamp with a message reporting whether the road is clean or dirty, e.g. subject to thresholds determined by the machine learning classifier. Alternatively, the location/message may only be sent when a dirty condition is detected.

In an alternate or additional implementation to that above, the system is configured to send images of the street, e.g. with any image captured person's face or number plates blurred out. Such steps may be necessary for complying with data privacy regulations. Although, in certain forms, the image data may relate to a crime such as fly-tipping, i.e. where large amounts of waste are illegally dumped on a roadside. Image data could be collected and stored as evidence to assist in prosecuting such crimes.

In an alternate or additional implementation to that above, the system is configured to send a classification of the observed waste. This may include size (e.g. dimensions) since bulky garbage needs a specific kind of clean up vehicle, or an indication of safety/danger where a toxic item is identified.

As alluded to, the various messaging capabilities may be implemented with any combination of the above.

In accordance with the foregoing description, the invention is able to determine overall street cleanliness and not only at specific sites such as waste bins or individual items of garbage.

The following examples outline implementation of the invention for six monitoring conditions/classifications, in addition to the street cleanliness context outlined above. However, each may generally utilize the same steps and equipment as described by reference to FIGS. 1 and 2:

1. A classifier such as a neural network can be trained to classify between a street that is full and one that still has available parking slots. Machine learning to find parking slots using neural networks is a feasible approach. In particular, the algorithm would check if there any legal free spaces in the region where the ego vehicle (i.e. the vehicle fitted with the system of the invention) parked and also on the opposing side of the road. Since visibility might be limited when only one front facing camera is available, in one example, at least one image collected before completing the parking operation could be used to provide a better estimation of the available parking slots in the street.

2. A classifier such as a neural network can be trained to classify between a street that is dark and one that has street lighting.

3. A classifier such as a neural network can be trained to classify between a street that is damaged (e.g. incidence of one or more pot holes, uneven surfaces, damaged markings) and one that does not need any maintenance.

4. A classifier such as a neural network can be trained to classify between a street that contains illegally parked vehicles and one that does not. The same comments about visibility for application 1 apply here.

5. A classifier such as a neural network can be trained to classify between a street that contains leaking water and one that does not. When considering water leaks, weather information can also be considered as the water might be due to rain. For instance, the vehicle's wiper signals can be monitored as water is expected to be found in the street if it is raining or has been raining recently.

6. A classifier such as a neural network can be trained to classify between a curb that is covered in snow/ice and one that is not.

As mentioned previously in connection with street cleanliness as a monitored condition, the above implementations may include sending GPS location/timestamp and a message about the road state. For each of the applications the message may communicate one or more of when:

The street is clean or dirty;

The street has free parking spaces or not;

The street is dark or not;

The street has visible road markers or not (this aspect can be extended to the other road infrastructure quality parameters, such as if the curb is damaged or not)

The street contains illegally parked vehicles or not;

The street contains any running water or not;

The curb is covered in ice or not.

The above communications may be a binary message, i.e. a periodic positive or negative report of the existence of a classified condition, or a positive report if and when a classified condition is identified.

By way of example, the solution may send GPS location, a message about the road state and also images of the street, e.g. with any person's face or number plates blurred out.

In a further example, the solution may send GPS location, a message about the road state and also further information depending on the application, such as a timestamp to identify when the state was observed. For each of the previously mentioned applications the additional information could include:

1. The (sub-)classification of garbage by for instance dimensions as bulky garbage needs specific kind of clean up vehicles;

2. The number of free parking spaces and their dimensions;

3. The level of illumination on a scale from 1 to 10, with 10 being a road properly illuminated at night and 1 being a pitch black road;

4. The extent of damage on a scale from 1 to 10, for instance 10 would mean there are no road markings and 1 would mean the road marking is only marginally impacted;

5. (Sub-)classification about how the car is illegally parked e.g. inside yellow lines, in front of garage, next to bins etc.

6. The extent of water in the road, between low, medium and high or on a scale of 1 to 10;

7. The extent of ice covering, e.g. on a scale, is the curb fully covered or are there only patches or ice/snow.

The above may be implemented in any combination.

The system is able to be implemented without need of any additional hardware since it utilizes an extant fleet/network of roaming data processors, e.g. private vehicles, each with a suite of image capturing devices. As such, the system does not depend on a local authority investment in hardware to equip public vehicles or other city infrastructure with sensors. The invention simply uses what is already available on smart vehicles. In a practical implementation, the system may prioritize vehicle operation features (e.g. relating to safe operation of the vehicle itself and those pedestrians and road users in the immediate vicinity, and other internal features such as entertainment) over street condition monitoring (i.e. a function of the vehicle that is not directly related to safety or operation of vehicle services such as entertainment and navigation).

In the general form described above, participation in the system is passive from the point of view of a vehicle owner since all that would be required is to agree with initial set up, i.e. authorize how data is collected and used. However, optionally, the system may provide for more active participation by a user. For example, a civic minded individual may actively seek out and report the presence of undesirable waste or damage in a particular location to supplement automated reporting and/or assist the classifier in its image processing accuracy.

It will be understood that the embodiments illustrated and described herein show applications only for the purposes of explanation. In practice, embodiments may be applied to many different configurations, the details of which being straightforward for those skilled in the art to implement.

To summarize, the invention enables an efficient system for collecting and processing image data at a vehicle for the purposes of classifying and determining the presence of certain conditions, e.g. of street level waste. The collected information, gathered by many vehicles, can then be used to quickly guide deployment of maintenance and/or waste removal services and track trends for the purposes of prevention, which may require intervention by law enforcement.

The invention embodies a realization of looking at overall street attributes such as cleanliness and not only at localized features such as individual items of garbage, while not depending on infrastructure like city installed cameras or sensors in bins. The invention considers global attributes for all the aforementioned applications, thus providing readily usable information to the authorities.

In other words, a system, method and/or vehicle is disclosed herein configurable for collecting and classifying image data according to a number of street conditions/states, e.g. cleanliness. A vehicle fitted with the system comprises at least one camera, for capturing image data of external environmental conditions, and an image processor configured to classify a street condition, e.g. by a neural network. An output according to determined street condition is wirelessly communicated to a remote receiving station coordinating incoming reports, where an allocation can be made, e.g. for sending municipal services and/or monitoring trends and resources. The system leverages existing vehicle sensors and communication devices to enable functionality as an environmental monitoring system. In one form, a control unit monitors processing load and enables image classification according to the invention only when sufficient headroom is available that does not compromise vehicle operation functions such as safety, infotainment and/or navigation.

As shown herein, data collection via smart vehicles equipped with sensors can help improve the quality of life in cities by assisting authorities act in a timely and efficient manner. There are a number of applications for which such a system could help society, for instance: street cleanliness, parking, and road and curb maintenance.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A vehicle system for a vehicle, the vehicle system comprising:

at least one sensor configured to capture data of external environmental conditions;

a controller configured to monitor a processing load of the vehicle and prioritize allocation of processing resources to a first mode over a second mode, wherein:

the first mode includes one or more driving assistance functions, the second mode includes an identification of at least one external street condition from the captured data, and the controller is configured to determine that a speed of the vehicle is below a speed threshold and, based on the determination that the speed of the vehicle is below the speed threshold, enable the second mode; and a wireless communication device configured to communicate information associated with the at least one external street condition to a remote receiving station.

2. The vehicle system of claim 1 wherein the at least one sensor is at least one camera on the vehicle.

3. The vehicle system of claim 1 wherein:

the at least one sensor includes a plurality of sensors, and the controller is configured to select one or more sensors from the plurality of sensors to allocate for use by the first mode or the second mode.

4. The vehicle system of claim 1 further comprising:

a global positioning system (GPS) device, wherein the controller is configured to send GPS location data and/or a timestamp with the at least one external street condition.

5. The vehicle system of claim 1 wherein the controller is configured to send images of a street via the wireless communication device.

6. The vehicle system of claim 1 wherein the at least one external street condition is classified into at least one condition selected from cleanliness, parking space occupancy, road damage, water coverage, curb damage, ice or snow coverage, or illumination.

7. The vehicle system of claim 6 wherein the selected condition is further sub-classified to a sub-condition.

8. A vehicle electronic control unit comprising:
at least one processor configured to:
    monitor a processing load of processing resources,
    prioritize allocation of the processing resources to a first mode over a second mode, wherein:
        the first mode includes one or more driving assistance functions, and
        the second mode includes an identification of at least one external street condition,
    determine that a speed of the vehicle is below a speed threshold and, based on the determination that the speed of the vehicle is below the speed threshold, enable the second mode, and
    classify between states of the at least one external street condition of the second mode to a state selected from cleanliness, parking space occupancy, road damage, water coverage, curb damage, ice or snow coverage, or illumination; and
a communication device configured to send information associated with the classified at least one external street condition to a remote receiving station.

9. A method of monitoring a street condition by a vehicle processor having processing resources, the method comprising:
    capturing data of external environmental conditions from at least one sensor in a vehicle;
    monitoring a processing load of the processing resources;
    allocating the processing resources by prioritizing a driving assistance function over an external street condition monitoring function;
    determining that the processing resources are available for a deprioritized external street condition monitoring function based on a determination of whether a speed of the vehicle is below a speed threshold;
    based on the determination that the processing resources are available for the deprioritized external street condition monitoring function, classifying the external street condition according to one or more of cleanliness, parking space occupancy, road damage, water coverage, curb damage, ice or snow coverage, or illumination; and
    communicating information associated with the classified external street condition to a remote monitoring station.

10. The method of claim 9 wherein one or more of location data, image data, and classification data of the street condition is communicated to the remote monitoring station.

11. A non-transitory computer-readable medium comprising processor-executable instructions that include:
    capturing data of external environmental conditions from at least one sensor in a vehicle, wherein the external environmental conditions include a street condition;
    monitoring a processing load of processing resources;
    allocating the processing resources by prioritizing a driving assistance function over an external street condition monitoring function;
    determining that the processing resources are available for a deprioritized external street condition monitoring function based on a determination of whether a speed of the vehicle is below a speed threshold;
    based on the determination that the processing resources are available for the deprioritized external street condition monitoring function, classifying the external street condition according to one or more of cleanliness, parking space occupancy, road damage, water coverage, curb damage, ice or snow coverage, or illumination; and
    communicating information associated with the classified external street condition to a remote monitoring station.

12. The vehicle system of claim 1 further comprising a neural network configured to classify the captured data into one of a clean environment condition and a dirty environment condition, wherein the at least one external street condition is based on the classification.

13. The vehicle system of claim 1 wherein the speed of the vehicle being below the speed threshold corresponds to the vehicle being stationary.

* * * * *